(12) United States Patent
English et al.

(10) Patent No.: US 8,328,210 B2
(45) Date of Patent: Dec. 11, 2012

(54) AXLE SUSPENSION

(75) Inventors: Danny E. English, Sherwood Park (CA); Shay O. Jarvis, Sherwood Park (CA); William D. Smith, Spruce Grove (CA)

(73) Assignee: Link Suspensions of Canada LP, Nisku, Alberta (CA)

( * ) Notice: Subject to any disclaimer, the term of this patent is extended or adjusted under 35 U.S.C. 154(b) by 112 days.

(21) Appl. No.: 13/005,779

(22) Filed: Jan. 13, 2011

(65) Prior Publication Data
US 2011/0175316 A1 Jul. 21, 2011

(30) Foreign Application Priority Data
Jan. 20, 2010 (CA) .................................. 2 690 484

(51) Int. Cl.
*B60G 21/05* (2006.01)
(52) U.S. Cl. ................................. 280/124.106
(58) Field of Classification Search ........... 280/124.106, 280/124.107, 124.116, 124.128, 124.13, 280/124.132
See application file for complete search history.

(56) References Cited

U.S. PATENT DOCUMENTS

| | | |
|---|---|---|
| 3,332,701 A | 7/1967 | Masser |
| 3,977,700 A | 8/1976 | Leaf |
| 4,132,433 A | 1/1979 | Willetts |
| 4,309,045 A | 1/1982 | Raidel |
| 4,415,179 A | 11/1983 | Mannelli |
| 4,460,196 A | 7/1984 | Perlini |
| 4,667,974 A | 5/1987 | Giese |
| 4,718,692 A | 1/1988 | Raidel |
| 4,995,634 A | 2/1991 | Evans |
| 5,013,063 A | 5/1991 | Mitchell |
| 5,039,124 A | 8/1991 | Widmer |
| 5,228,718 A | 7/1993 | Kooistra |
| 5,362,095 A | 11/1994 | Eveley |
| 5,366,237 A | 11/1994 | Dilling et al. |
| 5,549,320 A | 8/1996 | Ellingsen |
| 5,961,219 A | 10/1999 | Maughan |
| 5,971,425 A | 10/1999 | Dinsley et al. |
| 6,209,895 B1 | 4/2001 | Mueller et al. |
| 6,286,857 B1 | 9/2001 | Reese et al. |
| 6,439,588 B1 * | 8/2002 | Svensson ............... 280/124.116 |
| 7,017,941 B2 | 3/2006 | English |
| 7,325,796 B2 | 2/2008 | Moreland |
| 7,967,307 B2 * | 6/2011 | Reineck ................. 280/124.106 |
| 2005/0051986 A1 | 3/2005 | Galazin et al. |
| 2007/0001421 A1* | 1/2007 | Pierce et al. ............... 280/149.2 |

FOREIGN PATENT DOCUMENTS

| | | |
|---|---|---|
| GB | 901957 | 7/1962 |
| GB | 1150650 | 4/1969 |

* cited by examiner

*Primary Examiner* — Faye M. Fleming
(74) *Attorney, Agent, or Firm* — Dennis L. Thomte; Thomte Patent Law Office LLC

(57) ABSTRACT

An axle suspension includes a vehicular frame and first and second mounting fixtures mounted in spaced relation beneath the vehicular frame. First and second swing arms have first and second ends and are substantially parallel. The first ends are pivotally mounted to the first mounting fixture for vertical pivotal movement about a substantially horizontal first pivot axis. An axle is positioned on top of and perpendicular to the first swing arm and the second swing arm. The axle is mounted toward the second end of the first swing arm and the second swing arm by underlying resilient elastomer bushings wherein limited movement of the axle is accommodated about a substantially horizontal second pivot axis. Air spring suspension is positioned between the axle and the frame wherein pivotal movement in an upward direction about the first pivot axis is dampened.

5 Claims, 4 Drawing Sheets

AXLE SUSPENSION

FIELD

There is described an axle suspension for wheeled motor vehicles.

BACKGROUND

There is a need for an axle suspension that has increased roll moment resistance, high articulation, low roll centre, low vertical stiffness.

SUMMARY

There is provided an axle suspension, comprising a vehicular frame. A first mounting fixture and a second mounting fixture are mounted in spaced relation beneath the vehicular frame. First and second swing arms have first and second ends and are substantially parallel. The first ends are pivotally mounted to the first mounting fixture for vertical pivotal movement about a substantially horizontal first pivot axis. An axle having a first end and a second end is positioned on top of and perpendicular to the first swing arm and the second swing arm. The axle is mounted toward the second end of the first swing arm and the second swing arm by underlying resilient elastomer bushings wherein limited movement of the axle is accommodated about a substantially horizontal second pivot axis. Air spring suspension is positioned between the axle and the frame wherein pivotal movement in an upward direction about the first pivot axis is dampened. Springing may be accomplished by means other than air pressure and may for example include steel coil and leaf springs, as well as simple or complex shaped elastic materials.

The upper and lower swing arms may be positioned either in front of or behind the axle in a parallelogram configuration or on opposite sides of the axle in a "Watts" linkage configuration. Further the lower swing arm may be positioned in front of the axle in a "trailing arm" configuration or behind the axle in a "leading arm" configuration.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
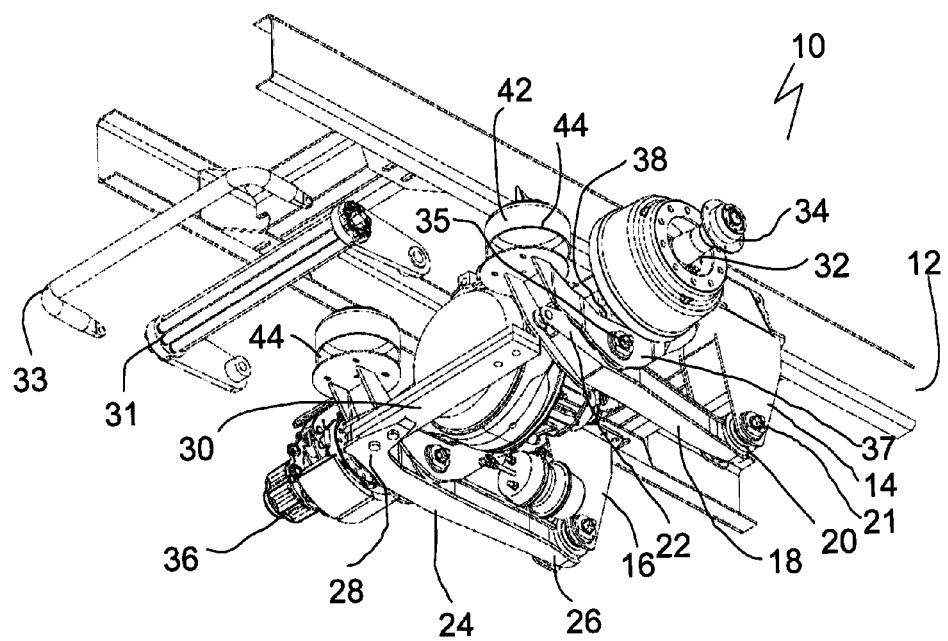
FIG. 1 is a bottom perspective view of an axle suspension

An axle suspension generally identified by reference numeral 10, will now be described with reference to FIG. 1 through FIG. 8.

Structure and Relationship of Parts

The discussion below relates to a suspension system for wheeled motor vehicles and trailers, and more specifically to a suspension system incorporating a new and improved roll stability system while also providing improved ride quality. In particular, axle suspension 10 was designed with a view to heavy-duty vocational applications, although it may also be used in other applications. For example, axle suspension 10 has been designed to improve the roll stability, which is considerably important in these applications, due to the heavy loads with high center of gravity. Most road suspensions in the prior art have high suspension frequencies (suspension spring rate) and where the suspension industry has introduced new off road suspensions with a lower suspension rate, the roll stability of these suspensions has been compromised.

Referring to FIG. 1, axle suspension 10 includes a vehicular frame 12, a first mounting fixture 14 and a second mounting fixture 16 which are mounted in spaced relation beneath the vehicular frame 12. Axle suspension 10 is primarily designed for use on a vehicle with a single rear axle. However, the high roll resistance of this suspension make it desirable to be used and applied in many locations and combinations on either a commercial or military vehicle, including tandem or tri-dem drive on a truck or tractor, in the front as a steering axle application and also on suspensions with non drive axles.

Figure 8:
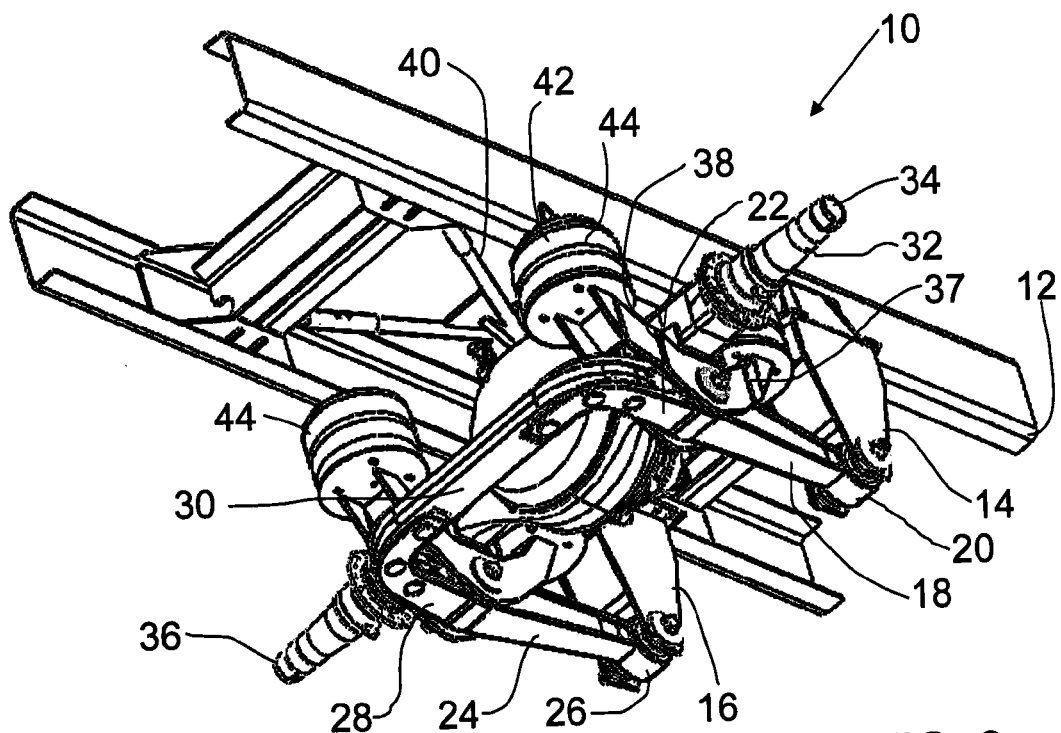
FIG. 8 is a bottom perspective view of an alternative axle suspension.

A first swing arm 18 has a first end 20 and a second end 22 and the first end 20 is pivotally mounted to the first mounting fixture 14 for vertical pivotal movement about a substantially horizontal first pivot axis 21. A second swing arm 24 has a first end 26 and a second end 28 and the first end 26 is pivotally mounted to the second mounting fixture 16 for vertical pivotal movement about the first pivot axis 21. The second swing arm 24 is substantially parallel to the first swing arm 18. A spring element, in the form of a load transfer assembly 30, connects between the second end 22 of the first swing arm 18 and the second end 28 of the second swing arm 24. The load transfer assembly 30 may be a spring steel plates as shown, or other similar designs, such as a torsion array configuration 31 or a torsion bar configuration 33, which are shown in the figures as options. Referring to FIG. 8, load transfer assembly 30 is preferably formed with rounded ends.

Figure 4:
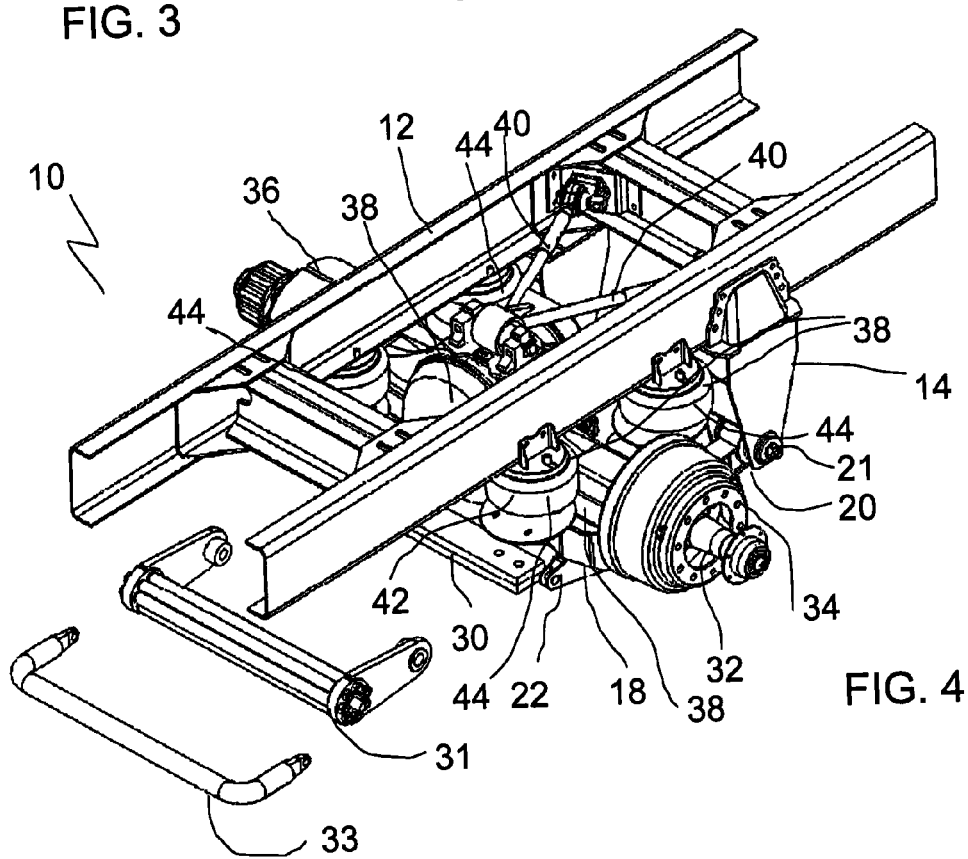
FIG. 4 is a top perspective view of the axle suspension illustrated in FIG. 1.
Figure 7:
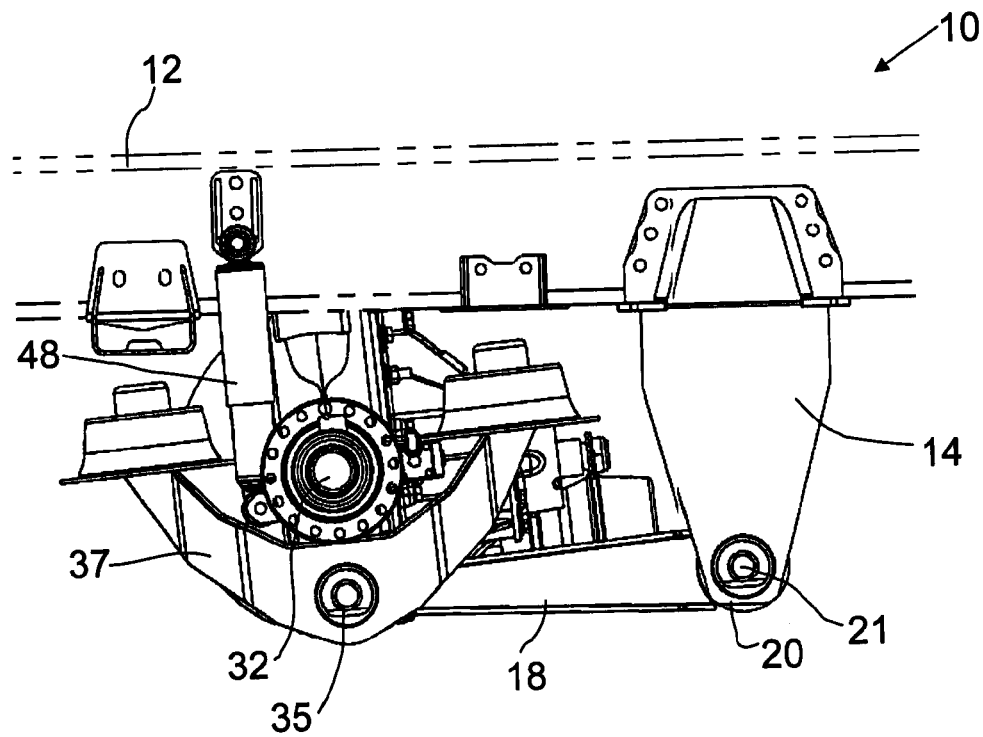
FIG. 7 is a side elevation view of the axle suspension illustrated in FIG. 1 with the air suspension components removed.

Referring to FIG. 4, an axle 32 has a first end 34 and a second end 36. The axle 32 is positioned on top of and perpendicular to the first swing arm 18 and the second swing arm 24. The axle 32 is mounted toward the second end 22 of the first swing arm 18 and the second end 28 the second swing arm 24 by an underlying resilient elastomer bushings 38 and by a V-shaped plate member, or cradle bracket 37. It will be understood that the size and shape of the cradle bracket 37 may be varied, but acts to raise axle 32 above the pivot axis 35, and connects to the air bags 44 discussed below. Limited movement of the axle 32 is accommodated about a substantially horizontal second pivot axis 35. The second pivot axis is offset from the first pivot axis. An upper linkage 40, such as a V-rod assembly, connects the axle 32 and the frame 12 at a cross member location, which controls the pivotal movement about the first pivot axis. Because of obstructions, such as the engine or other components, the V-rod assembly may also be two upper rods mounted at an angle to form a V-shape, with the apex connected to the axis via a rigid extension 41 above the axis and the distal ends connected to the frame 12, as depicted. Upper linkage 40 is preferably in a plane that is substantially parallel to the swing arms 18 and 24, however it may be at a slightly different angle, as shown. Referring to FIG. 7, shock absorbers 48 are positioned between axle 32 and frame 12. As shown, shock absorbers 48 are connected between cradle bracket 37 and the frame 12 to dampen suspension movement while upper linkage 40 and lower beams 18 and 24 create a parallelogram structure to encourage vertical movement of axle 32. These shock absorbers 48 are preferably tuned to optimize the vehicle ride. In the depicted example, one shock absorber 48 is provided, with another not shown on the other side. Alternatively, there may be two shock absorbers 48 on each side, depending on the preferences of the user.

Figure 3:
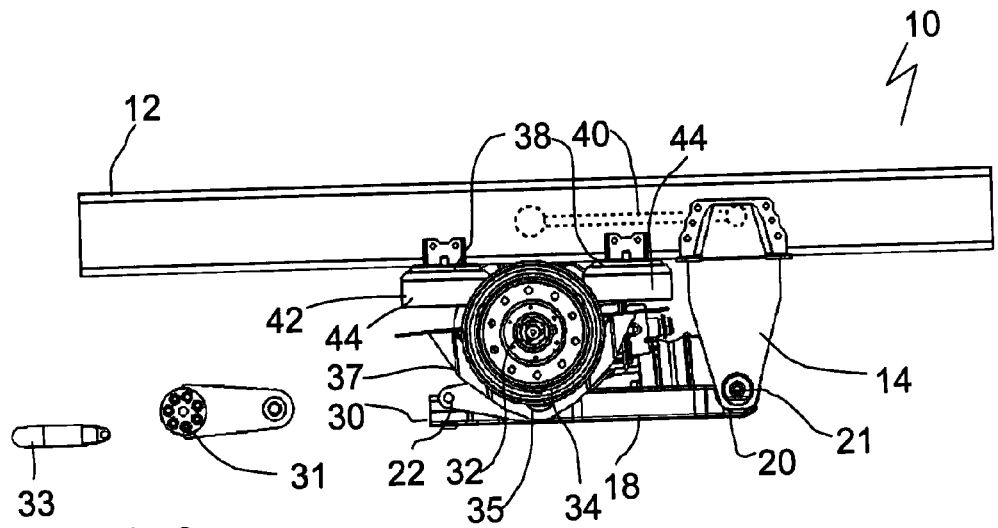
FIG. 3 is a side elevation view of the axle suspension illustrated in FIG. 1.

As can be seen, first and second swing arms 18 and 24 are substantially horizontal, with pivots 21 and 35 on each side being in the same horizontal plane. Referring to FIG. 3, with the upper linkage 40 described above, the suspension 10 preferably has a parallelogram structure in a plane perpendicular to the axle 32 that helps convert rotational movement around the axis 21 into substantially vertical movement of the axle 32, made up of the upper linkage 40 and swing arms 18 and 24 as one set of parallel members, and cradle brackets 37 and fixtures 14 and 16 as the other set of parallel members. Alternatively, upper linkage 40 could be positioned on the opposite side of the axle 32 similar to a Watts linkage as shown in FIG. 8. Suspension 10 also preferably forms a parallelogram structure in a plane parallel to the axle 32, made up of load transfer assembly 30, upper linkage 40, and cradle brackets 37 with air suspension 42.

Figure 2:
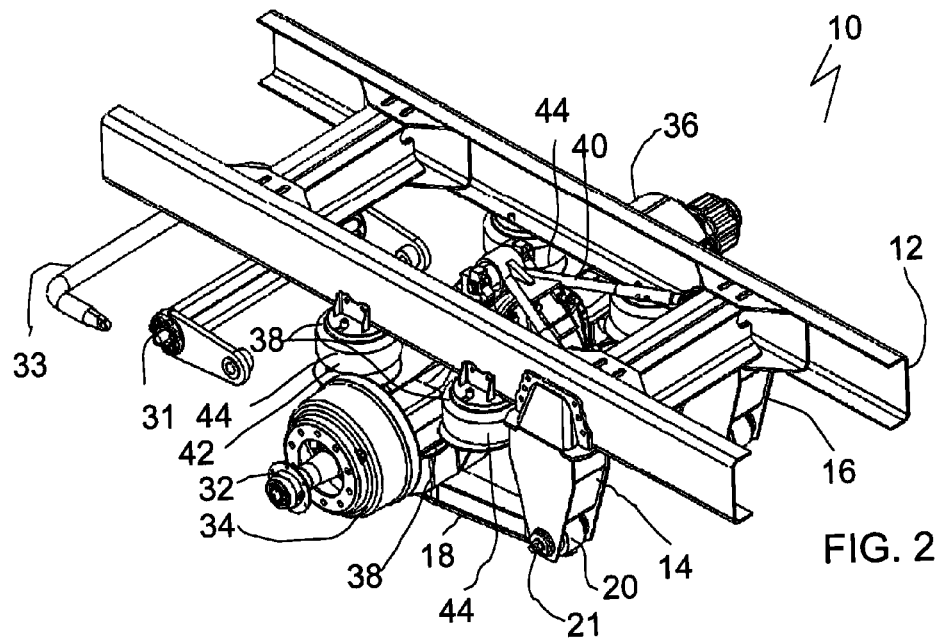
FIG. 2 is a top perspective view of the axle suspension illustrated in FIG. 1.
Figure 6:
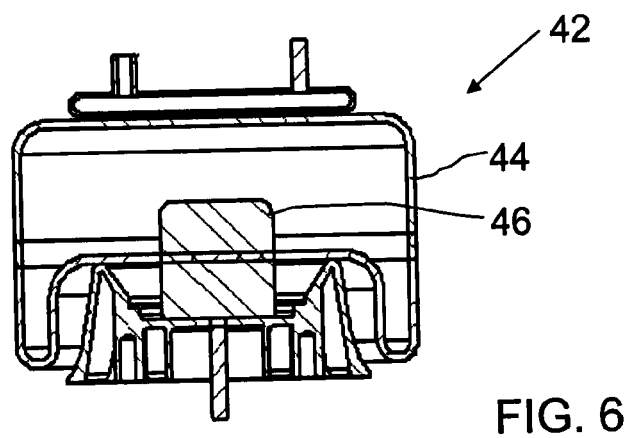
FIG. 6 is a side elevation view in section of an air spring.

Referring to FIG. 2, air spring suspension 42 is positioned between the axle 32 and the frame 12, which dampens pivotal movement in an upward direction about the first pivot axis. The air spring suspension 42 includes air bags 44 positioned on either side of the axle 32 and connected to the cradle bracket 37 at the first end 34 of the axle 32 and air bags 44 positioned on either side of the axle 32 at the second end 36 of the axle 32. Referring to FIG. 6, air spring suspension 42 includes air bag 44 as well as an inner resilient cushion 46 such that, when a sufficient force is applied to overcome air bag 44, cushion 46 provides additional shock absorbing capability and also provides a secondary spring rate for additional roll resistance.

Operation

Referring to FIG. 1, axle suspension 10 works to create a roll resistance while providing a low roll centre, low vertical stiffness and high articulation in a vehicle to which it is attached. The axle suspension 10 is mounted to a vehicle frame 12 by first mounting fixture 14 and second mounting fixture 16. A first end 20 of first swing arm 18 is attached to first mounting fixture 14 and a first end 26 of second swing arm 24 is attached to second mounting fixture 16 such that both are able to pivot vertically about the horizontal axis 21. A spring element, in the form of a load transfer spring 30, torsion array configuration 31 or torsion bar configuration 33, is attached between the second end 22 of the first swing arm 18 and the second end 28 of the second swing arm 24.

Referring to FIG. 2, an axle 32 is positioned on top of and perpendicular to the first swing arm 18 and the second swing arm 24 and is mounted with resilient elastomer bushings 38. Bushings 38 may also be positioned between air bags 44 and frame 12. Limited movement of the axle 32 is accommodated about a substantially horizontal pivot axis 35. Upper linkage 40 is positioned between the axle 32 and the frame 12 to act against pivotal movement and to create a parallelogram structure to encourage vertical movement of the axle 32. Air spring suspension 42 consisting of air bags 44 positioned on either side of the axle 32 at the first end 34 and the second end 36, and is also positioned between the axle 32 and the frame 12 and dampens pivotal movement in an upward direction.

Referring to FIG. 4, axle suspension 10 stabilizes a vehicle from rolling by providing dampening to pivotal movement. The air bags 44 are compressible and expandable. As a vehicle begins a rolling motion to the right, the air bags 44 on the right hand side would become compressed under the pressure and the air bags 44 on the left would be expanded. To return to a state of equilibrium, air bags 44 on both sides of the axle 32 would exert pressure and dampen the upwards movement.

Figure 5:
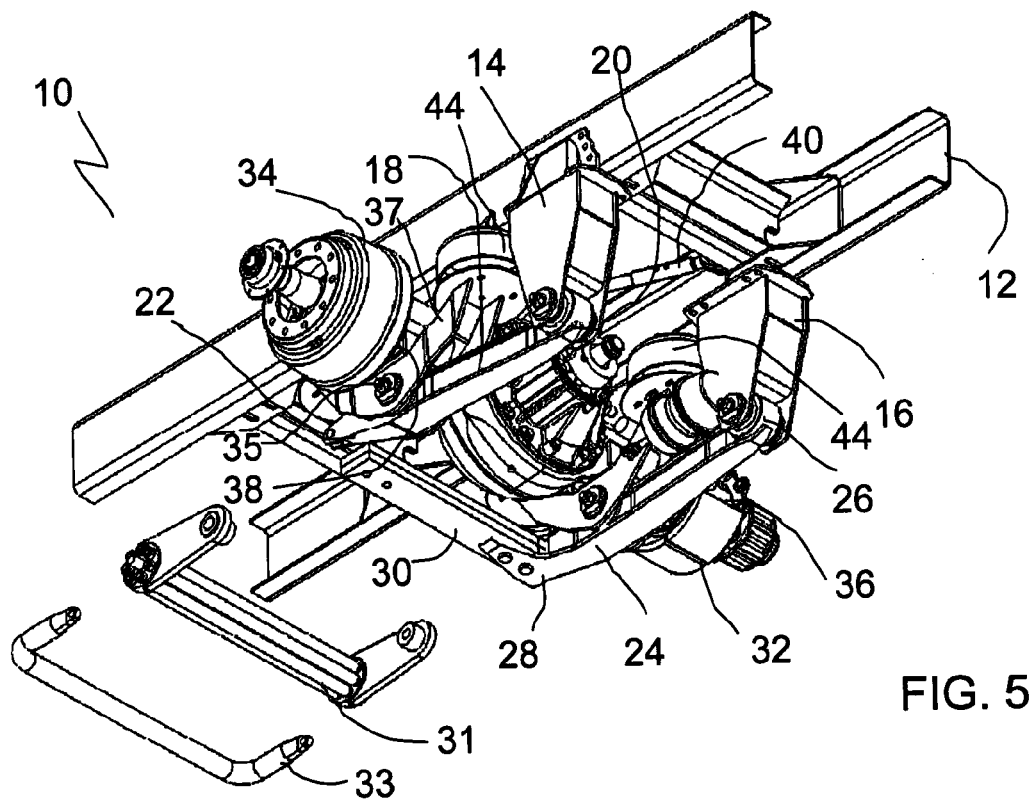
FIG. 5 is a bottom perspective view of the axle suspension illustrated in FIG. 1.

Referring to FIG. 5, the suspension geometry of upper linkage 40 and swing arms 18 and 24 connected to each other at the rear through two rectangular high alloy steel beams helps enhance the roll resistance of the suspension. Also adding to a secondary increased roll resistance is the elastomer cushion 46 within air springs 44, as shown in FIG. 6. The resilient elastomer cushion 46 in conjunction with shock absorbers 48 shown in FIG. 7 dampen pivotal movement of the suspension. The upper linkage 40 helps to create roll resistance by lengthening and shortening as a vehicle sways. This dampens pivotal movement and helps to stabilize the vehicle. The resilient elastomer bushings 38 also work to dampen pivotal movement by providing limited movement of the axle 32.

Advantages

The configuration illustrated and described provides the following advantages to other axle air sprung suspensions:

1. High roll stability due to the design that includes two lower control arms pivoted and connected through the cradle below the axle housing, an upper control arm, also referred to as a v-rod, a high alloy double custom spring leaf assembly connecting the two lower control arms, with a shaped internal elastomeric stop within the air springs allows a staged roll stiffness gain. The stiffness gain is uniform throughout the centre 60% of roll. The remaining 40% of the angular axle motion (20% at each end) doubles the roll stiffness gain. The results are:
   a) Superior cornering—no leaning into curve.
   b) Elimination of side to side shock loads on severe off road terrain. There will be no solid metal to metal contact as a result of internal (elastomeric) stops at the end of the suspension roll.
   c) Enhanced ride characteristics through the use of the four air springs allowing a larger volume/lower air pressure system.
2. High roll moment resistance due to a combination of pneumatic and elastic suspension components, combined with lateral spring elements.
3. High cross articulation due to the location of key components and degree of flexibility designed into the bushings.
4. Low roll centre
5. Low vertical stiffness due to the four air springs that allow for a lower air pressure and with tuned shocks, allows for the best possible ride characteristics, as lower air pressure generally results in an improved ride frequency.
6. Low maintenance with the use of elastomeric bushings (shock absorbers will wear and need to be replaced).
7. Application versatility, as the present teachings can be used not only on drive axles but also on non-drive axles, such as on trailers, and steer axles, such as I-beam or fabricated types. In case of a steer axle application, within the engine compartment the upper v-rod may be replaced by two upper control rods positioned at an angle to absorb the transverse loads. In addition this, the suspension can be used in all locations of the vehicle and for either tandem or tri-dem applications.
8. Suspension versatility, as the present teachings allow for a standard parallelogram type suspension as well as a "Watt's" type linkage with minimal alteration. A Watt's Linkage has the advantage of nearly eliminating lateral motion in the middle of its operating range.

9. High Brake/Acceleration Torque Reaction, due to high component stiffness combined with geometry of trailing arm and upper V-rod components.
10. Axle pinion angle variance—This concept with the upper lower control arms will result in a minimal change of pinion angle thus improving driveline life and possible vibration.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. Those skilled in the art will appreciate that various adaptations and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:

1. An axle suspension system, comprising:
   an elongated and longitudinally extending vehicular frame;
   a first mounting fixture and a second mounting fixture mounted in a transversely spaced relation beneath said vehicular frame;
   a first elongated and longitudinally extending swing arm having a first end and a second end;
   said first end of said first swing arm being pivotally secured to said first mounting fixture about a horizontally disposed first pivot axis which is transversely disposed with respect to said vehicular frame;
   a second elongated and longitudinally extending swing arm having a first end and a second end;
   said first end of said second swing arm being pivotally secured to said second mounting fixture about a horizontally disposed second pivot axis which is transversely disposed with respect to said vehicular frame;
   said first and second swing arms being substantially parallel to one another;
   a load transfer assembly secured to and extending between said second ends of said first and second swing arms;
   an elongated and longitudinally extending first cradle bracket having first and second ends;
   said first cradle bracket being pivotally secured, intermediate its ends, to said first swing arm about a horizontally disposed and transversely extending third pivot axis;
   an elongated and longitudinally extending second cradle bracket having first and second ends;
   said second cradle bracket being pivotally secured, intermediate its ends, to said second swing arm about a horizontally disposed and transversely extending fourth pivot axis;
   said third pivot axis and said fourth pivot axis being parallel to one another;
   an elongated axle having a first end, a second end, a first side and: a second side;
   said axle being secured, adjacent said first end thereof, to said first cradle bracket intermediate said first and second ends of said first cradle bracket;
   said axle being secured, adjacent said second end thereof, to said second cradle bracket intermediate said first and second ends of said second cradle bracket;
   a first air spring suspension member secured to and extending between said vehicular frame and said first end of said first cradle bracket;
   a second air spring suspension member secured to and extending between said vehicular frame and said second end of said first cradle bracket;
   a third air spring suspension member secured to and extending between said vehicular frame and said first end of said second cradle bracket;
   a fourth air spring suspension member secured to and extending between said second end of said second cradle bracket;
   said first and third air spring suspensions being positioned at said first side of said axle;
   said second and fourth air spring suspensions being positioned at said second side of said axle;
   a V-shaped upper linkage having an apex and distal ends;
   said apex of said upper linkage being secured to said axle with said distal ends of said upper linkage being secured to said vehicular frame whereby said upper linkage acts against lateral movement of said axle and acts against relative vertical movement of said first and sedond swing arms.

2. The axle suspension system of claim 1 further comprising at least one shook absorber positioned between said first cradle bracket and said vehicular frame and at least one shock absorber positioned between said second cradle bracket and said vehicular frame.

3. The axle suspension system of claim 1 wherein said upper linkage, said first and second swing arms, said first and second cradle brackets and said first and second mounting fixtures form a parallelogram structure in a plane perpendicular to said axle.

4. The axle suspension system of claim 1 wherein said first and second swing arms, said V-shaped upper linkage and said first and second cradle brackets form a Watts linkage.

5. The axle suspension system of claim 1 wherein said load transfer assembly, said V-shaped upper linkage and said first and second cradle brackets form a parallelogram structure in a plane parallel to said axle.

* * * * *